O. B. MATTSON.
HAY SWEEP.
APPLICATION FILED MAR. 3, 1914.
1,112,223.
Patented Sept. 29, 1914.
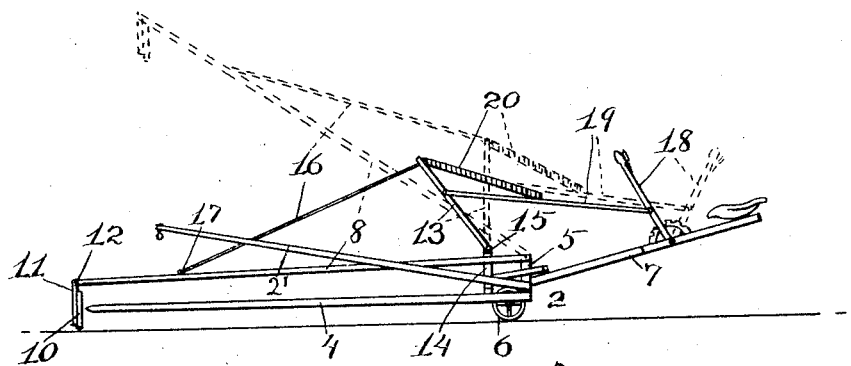
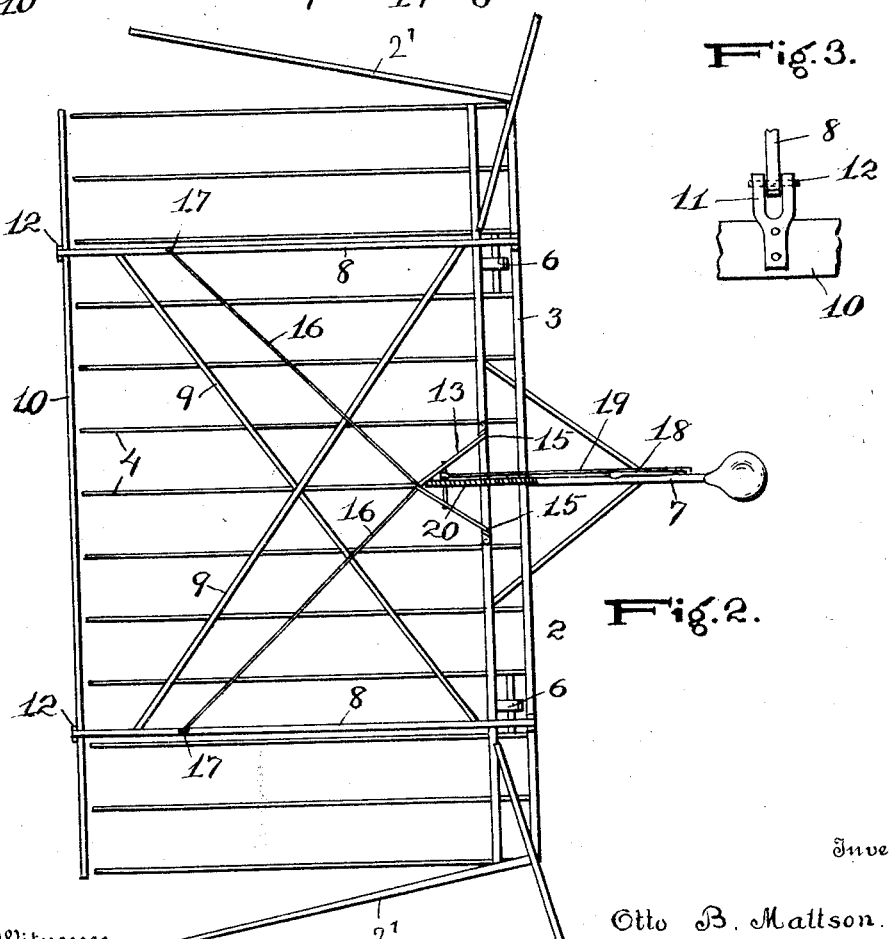
Witnesses
Stuart Hilder.
Frances W. Anderson
Inventor
Otto B. Mattson.
By E. W. Anderson
his Attorneys

UNITED STATES PATENT OFFICE.

OTTO B. MATTSON, OF CRAIG, NEBRASKA.

HAY-SWEEP.

1,112,223.

Specification of Letters Patent. Patented Sept. 29, 1914.

Application filed March 3, 1914. Serial No. 822,216.

*To all whom it may concern:*

Be it known that I, OTTO B. MATTSON, a citizen of the United States, resident of Craig, in the county of Burt and State of Nebraska, have made a certain new and useful Invention in Hay-Sweeps; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention as applied, the raised portion of the invention being shown in dotted lines. Fig. 2 is a plan view of the invention as applied. Fig. 3 is a detail face view of the hinge of the push bar.

The invention has relation to hay sweeps, having for its object to provide an improvement therein which may be in the form of an attachment to be connected to any ordinary hay sweeping machine, such improvement being designed to render the machine more efficient.

The invention consists in the novel construction and combinations of parts as hereinafter set forth.

In the accompanying drawings illustrating the invention, the numeral 2 indicates a portion of the framing of a hay sweeping machine, substantially the bar 3 to which the sweep teeth 4 are attached, lateral standards or uprights 5, wheels 6 supporting the machine and rearwardly extending seat support 7.

Draft connections are shown at 2′.
Pivoted to the framing at or near the upper ends of the uprights 5 is the attachment, which consists mainly of lateral arms 8, 8, bracing bars 9, 9, a front transverse push or scraper bar 10, and operating lever devices. The lateral arms 8, 8, have depending therefrom at their outer or free ends arms 11, to which the push bar 10 is connected, parts 11, being pivoted to parts 8 at 12, the pivotal connections being designed to provide for swinging the push bar upwardly or for depression thereof so that it will be located in front of the points of the teeth 4 of the sweeping machine. The pivotal connections are made at the front side of the guard bar so that it can swing forward or backward to suit the position of the points of the sweep teeth. The attachment is mainly constructed preferably of wood to secure lightness, and the rear surface of the push bar which is designed for bracing contact with the points of the sweep teeth may be protected by a sheet metal facing.

Suitable means of lever operated adjustment for the push bar are provided, preferably converging bars 13, pivoted to the upper ends of uprights 14 of the framing at 15 and meeting at their front ends, where said bars are provided with diverging connecting rods 16, pivotally connected thereto, said connecting rods having pivotal connection with the lateral arms 8 at 17; an operating lever 18 having rod or bar connection 19 with converging bars 13. A pull spring 20, connected to the outer or free ends of the bars 13 and in rear to the rod or bar connection 19, may be used to assist in raising the push bar, upon operation of the lever, being designed to lighten the pull of the latter.

In the operation of the invention, before the hay sweep is operated to gather hay from the windrow the push bar is swung upward to the position shown in dotted lines, Fig. 1 of the drawings, by operation of the lever, said push bar being held in raised position until the hay sweep teeth with the load of hay thereupon are engaged with the stacker teeth and the hay load forked over or dumped upon the stacker teeth. The hay sweep is now backed away from the stacker, and will in this movement pull some of the hay load back with it. The push bar is now depressed in front of the sweep teeth, by operation of the lever, and the hay sweep driven up again to the stacker, to push the scattered or loose hay upon the stacker teeth again.

What I claim is:

In a hay sweep, uprights, lateral arms pivoted at their rear ends to said uprights, a transverse scraper bar pivoted to the forward ends of said arms and adapted to be lowered in front of and to have bracing engagement with the points of the sweep teeth, and lever operated devices for raising and lowering said arms and the push bar.

In testimony whereof I affix my signature, in the presence of two witnesses.

OTTO B. MATTSON.

Witnesses:
J. S. HOLLAND,
CARL L. HOLLAND.

Copies of this patent may be obtained for five cents each, by addressing the "Commissioner of Patents, Washington, D. C."